May 9, 1967 O. ROGG 3,318,193
GEAR SHAPING MACHINE
Filed Jan. 7, 1966 5 Sheets-Sheet 1

Inventor:
Otto Rogg

May 9, 1967  O. ROGG  3,318,193
GEAR SHAPING MACHINE

Filed Jan. 7, 1966  5 Sheets-Sheet 2

Inventor:
Otto Rogg

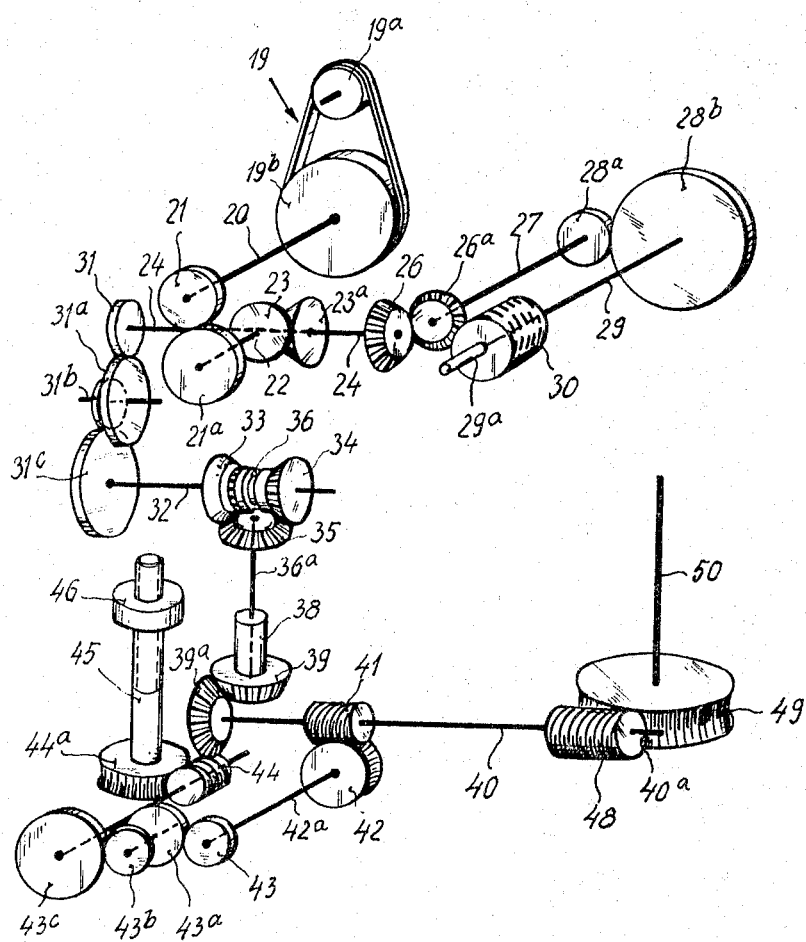

Inventor:
Otto Rogg

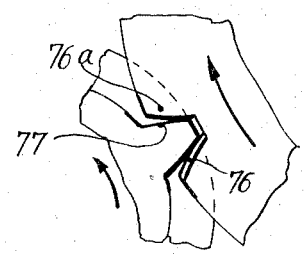
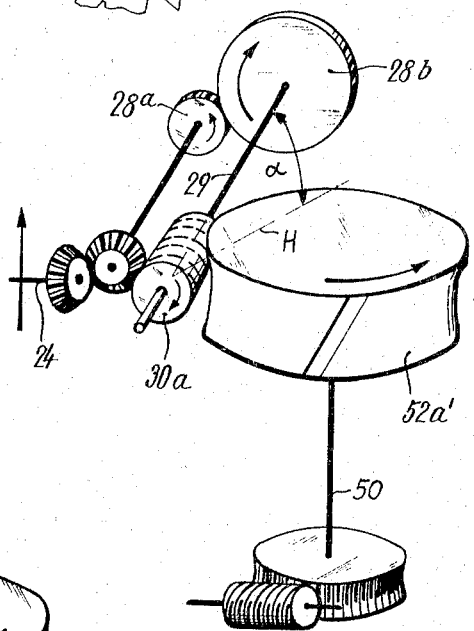
Fig. 7a
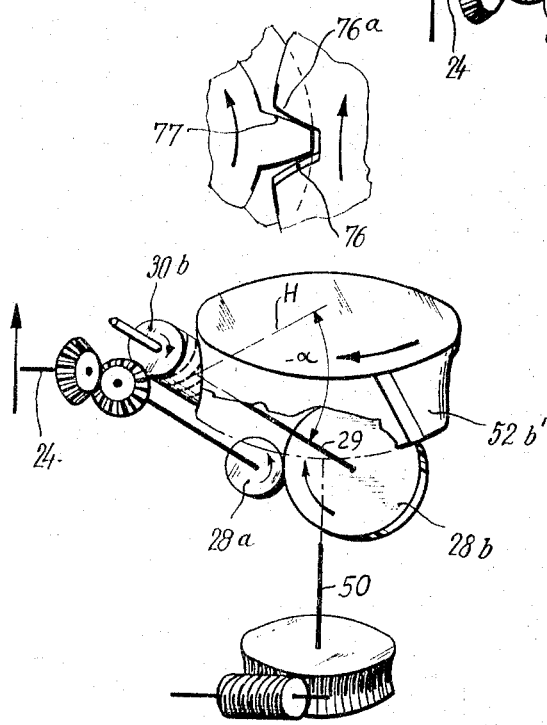
Fig. 7b
INVENTOR:
OTTO ROGG

United States Patent Office 3,318,193
Patented May 9, 1967

3,318,193
GEAR SHAPING MACHINE
Otto Rogg, Munich, Germany, assignor to Carl Hurth Maschinen- und Zahnradfabrik, Munich, Germany
Filed Jan. 7, 1966, Ser. No. 519,391
Claims priority, application Germany, Nov. 29, 1960, H 41,074
10 Claims. (Cl. 90—4)

This is a continuation-in-part of my copending application Ser. No. 155,042, filed Nov. 27, 1961, now U.S. Patent No. 3,233,519.

The present invention relates to gear shaping machines in general, and more particularly to a machine which is especially suited for shaping of spur gears and helical gears by means of a worm-like shaping tool.

An important object of the invention is to provide a gear shaping machine wherein the rotary motion transmitting connection between the tool and the workpiece comprises a small number of groupwise arranged mating gears, and wherein the mating gears or splines which directly transmit rotary motion to the tool spindle operate without backlash when the machine is in actual use.

Another object of the invention is to provide a gear shaping machine wherein the same backlash eliminating structure may be used in treatment of right-hand and left-hand gears.

A further object of the instant invention is to provide a novel backlash- and vibration-eliminating arrangement between the mating gears and/or splines in one or more motion-transmitting groups of the gear shaping machine, particularly in the drive for the tool which treats the workpieces.

Briefly stated, one feature of my present invention resides in the provision of a machine for shaping, hobbing or otherwise treating gears and similar toothed workpieces by means of hobs and analogous tools. The machine comprises a drive including a main shaft rotatable in a predetermined direction, a tool holder turnable about the axis of the main shaft, a spindle or an analogous tool supporting member rotatably mounted in the tool holder, a motion transmitting connection between the main shaft and the tool supporting member including at least one backlash eliminating device which is operative when the main shaft rotates in the aforementioned predetermined direction, and a rotary spindle or analogous work supporting member adjacent to the tool holder. The work supporting member is positioned with reference to the tool supporting member in such a way that, in response to appropriate angular adjustment of the tool holder with reference to the main shaft, a left-hand or right-hand tool affixed to the tool supporting member can treat a complementary (straight, left-hand or right-hand) workpiece on the work supporting member while the main shaft rotates in the predetermined direction. In other words, the same backlash eliminating device can be used in treatment of left-hand and right-hand gears. This is of considerable advantage because a backlash eliminating device is effective in one direction only.

In accordance with a presently preferred embodiment of my invention, the main shaft is rotatable about a horizontal axis and the work supporting member is rotatable about a vertical axis. The tool supporting member extends radially with reference to the axis of the shaft and its holder may be fixed in selected angular position by means of bolts and nuts or other suitable locking devices. The backlash eliminating device may be mounted in one of the gears which transmit motion from the shaft to the tool supporting member, or in a pair of cooperating splined elements which form part of the tool supporting member.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawings, in which:

FIG. 1b is a fragmentary axial section through the tool slide as seen in the direction of arrows from the line Ib—Ib of FIG. 1a;

FIG. 2 is a schematic perspective view of various groupwise arranged motion transmitting, reversing and speed changing gears forming part of the machine shown in FIG. 1;

FIG. 7a is a perspective view of a portion of the machine, showing the position of a right-hand tool during treatment of a right-hand gear; and FIG. 7b is a similar perspective view but showing the position of a left-hand tool during treatment of a left-hand gear.

Figure 1:
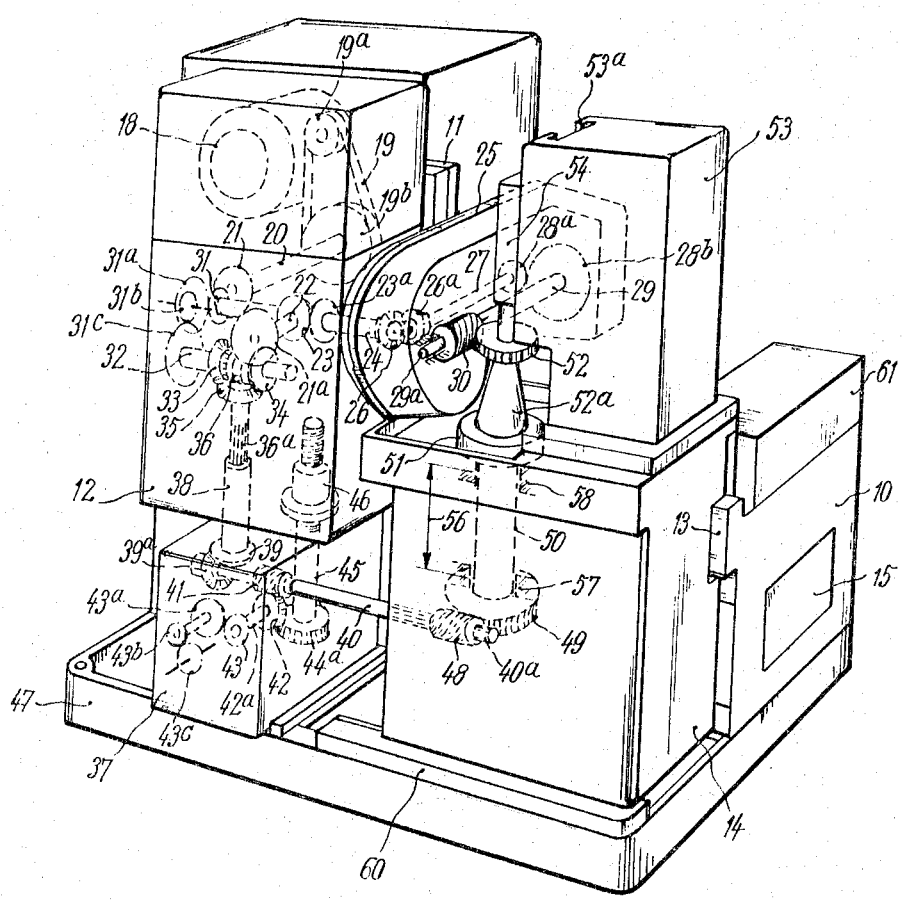
FIG. 1 is a somewhat schematic perspective view of a gear shaping machine which embodies my inventon.

Referring first to FIGS. 1 and 2, there is shown a gear shaping machine which comprises a base or frame 10 supporting a vertical guide 11 for a reciprocable tool slide 12, and a horizontal guide 13 for a reciprocable work slide 14. As shown in FIG. 1, the guides 11, 13 are mounted on the vertical front end wall of the base 10 and control the direction of reciprocatory movement of the slides 12, 14 in such a way that these slides travel in paths which make right angles with each other. The guides 11, 13 may but need not be disposed in a common vertical plane. The frame 10 defines an internal chamber which accommodates a withdrawable shavings-collecting pan 15.

Figure 1A:
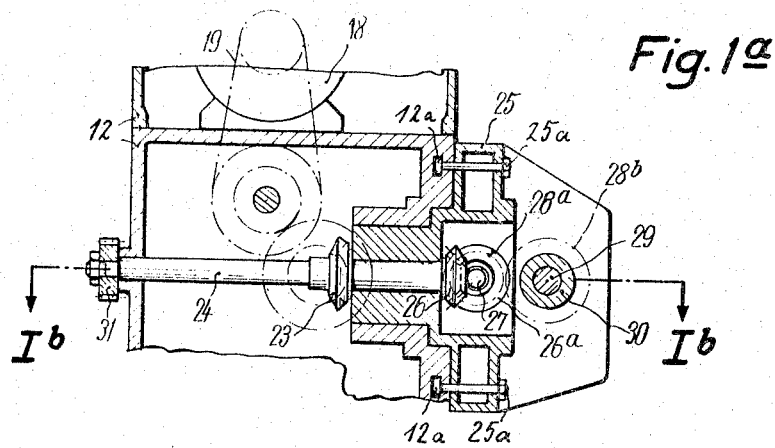
FIG. 1a is a fragmentary axial section through the tool slide as seen in the direction of arrows from the line Ia—Ia of FIG. 1b.
Figure 1B:
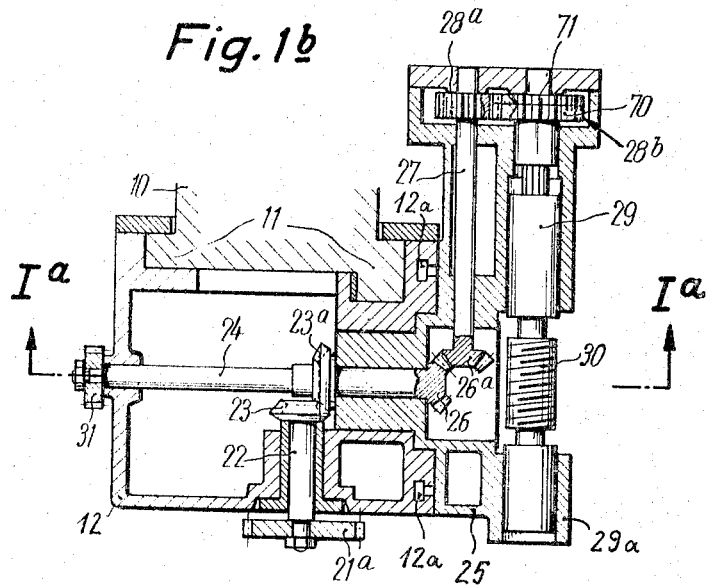

In the upper portion of the tool slide 12, there is provided a prime mover in the form of an electric motor 18 which operates a V-belt drive including a pair of multi-groove sheaves or pulleys 19a, 19b and a series of V-belts 19. The pulley 19b is mounted at one end of and drives a shaft 20 whose other end carries a spur gear 21 forming part of a speed change gear which, in the embodiment of FIGS. 1 and 2, includes a second spur gear 21a meshing with the gear 21, a shaft 22 which is driven by the gear 21a, and a bevel gear 23 which is driven by the shaft 22. The speed change gear determines the r.p.m. of the tool. The bevel gear 23 of this speed change gear drives a bevel gear 23a which is mounted on and rotates a horizontal main shaft 23 whose right-hand portion projects from the tool slide 12 and into a turnable tool holder 25. The latter is mounted on the tool slide 12 and is turnable about the axis of the main shaft 24. As shown in FIGS. 1a and 1b, the tool holder 25 may be arrested and locked in one or more angular positions of adjustment with respect to the slide 12 by bolts 25a whose heads extend into an arcuate groove 12a of the tool slide 12. The purpose of such adjustability of the tool holder 25 will be described in connection with FIGS. 7a and 7b. The center of curvature of the groove 12a is located on the axis of the main shaft 24.

The main shaft 24 carries at its right-hand end a bevel gear 26 which mates with a bevel gear 26a mounted at one end of a shaft 27 which is rotatably mounted in the tool holder 25 and whose other end carries a pinion 28a. This pinion in turn meshes with a spur gear 28b which is mounted on a spindle 29 for a worm-shaped tool 30. In the embodiment of FIGS. 1 and 2, the tool 30 is assumed to be a hob. The shaft 27 and the two groups of mating toothed gears 26, 26a and 28a, 28b constitute a motion transmitting connection between the drive which includes the main shaft 24 and the tool spindle 29. That end face of the tool 30 which is turned away from the spindle 29 is supported by a suitable backrest 29a best shown in FIG. 1b.

The left-hand end of the main shaft 24 removably carries one spur gear 31 of a gear train constituting an index change gear which also includes gears 31a, 31b, 31c, the latter being mounted on a horizontal shaft 32 forming part of another gear group which constitutes a reversing gear. In the illustrated embodiment, the reversing gear includes a pair of spaced bevel gears 33, 34 which are freely rotatable on the shaft 32 and are in permanent mesh with a driven bevel gear 35 mounted at the upper end of a splined shaft 36a, and a clutch sleeve 36 which is driven by and is slidable along the shaft 32. This sleeve is provided with a set of teeth at each of its axial ends so that it may mesh with complementary teeth of the gear 33 or 34 in order to drive the bevel gear 35 and the splined shaft 36a in a clockwise or in an anticlockwise direction. The control lever which shifts the sleeve 36 along the shaft 32 into engagement with the gear 33 or 34 is not shown in the drawings. The purpose of the reversing gear is to drive the work spindle 50 in a clockwise or in an anticlockwise direction.

The lower end of the splined shaft 36a extends from the underside of the tool slide 12 and into a stationary housing 37 which is fixed to the bedplate 47 of the machine. The housing 37 accommodates an internally splined rotary cylinder 38 which receives the splined lower end of the shaft 36a and transmits rotary motion to a bevel gear 39 meshing with a bevel gear 39a mounted at the left-hand end of a worm shaft 40. The splined shaft 36a and the cylinder 38 constitute a third group of gears forming part of a driving connection between the main shaft 24 and the work spindle 50. Owing to the fact that the cylinder 38 is rotatable in the stationary housing 37 and that the splined shaft 36a is free to perform axial movements with respect to the cylinder 38, the connection between the reversing gear and the worm shaft 40 is not interrupted when the tool slide 12 is caused to reciprocate in its guide 11. The bevel gears 39, 39a constitute a fourth group of mating gears in the driving connection between the main shaft 24 and the work spindle 50.

The tool slide 12 is reciprocated in the following manner: the worm shaft 40 carries a worm 41 which is located in the housing 37 and meshes with a worm wheel 42 mounted on the input shaft 42a of a feed change gear. This feed change gear further includes a gear train 43, 43a, 43b, 43c, the latter mounted on and driving a worm shaft (see FIG. 2) whose worm 44 meshes with a worm wheel 44a mounted at the lower end of a vertical feed spindle or screw 45. The upper portion of the screw 45 projects into the tool slide 12 and meshes with an internally threaded spindle nut 46 which is rigidly mounted in the slide 12 so that rotary movements of the screw 45 in a clockwise or in an anticlockwise direction will compel the slide 12 to move up or down in its guide 11. The feed change gear 42a-43c selects the speed at which the slide 12 is moved in its guide 11. It is preferred to provide some means for eliminating any, even slightest, traces of backlash between the meshing threads of the screw 45 and spindle nut 46. Owing to the fact that the housing 37 of the feed change gear 42a-43c is mounted directly on the bedplate 47, and owing to the fact that the feed screw 45 is held against axial movement with respect to the housing 37, the slide 12 cannot bring about any displacements of the screw 45 when it reciprocates in the guide 11.

The right hand portion 40a of the worm shaft 40 is splined and projects into the lower part of the work slide 14 where it meshes with an internally splined worm 48 so that the latter may perform axial movements with respect to but is compelled to share all angular movements of the shaft 40. The worm 48 drives a worm wheel 49 which is provided at the lower end of the work spindle 50. The worm 48 and the worm wheel 49 constitute the fifth and last group of gears in the driving connection between the main shaft 24 and the work spindle 50. The head 51 of the spindle 50 may assume the form of a chuck or a like retaining means for the workpiece 52.

The work slide 14 is engaged by a horizontal retaining rail 60 which is fixed to the bedplate 47 so as to prevent any lateral play but to permit horizontal reciprocatory movements of the slide 14 along the guide 13. The upper portion 53 of the slide 14 constitutes a backrest and is provided with vertical ways 53a for a tailstock 54 which engages the upper end of the workpiece 52 and more particularly the upper end of a mandrel 52a on which the workpiece is mounted. The tailstock 54 is vertically adjustable in the ways 53a.

The gears and eventually the motor for effecting feed movements of the slide 14 along the guide 13 are accommodated in a gear box 61 which is mounted on the base 10. The exact construction of the feed change gears in the box 61 forms no part of this invention.

The work spindle 50 is rotatably mounted in a pair of spaced bearings 57, 58 which are provided in the work slide 14 and whose distance 56 preferably exceeds the distance between the upper bearing 58 and the workpiece 52. Such mounting of the spindle 50 insures that the workpiece is properly supported during a gear shaping operation, particularly since the diameter of the spindle is comparatively large as clearly shown in FIG. 1. Such machine may be utilized for shaping of very large gears and enables the tool 30 to remove thick shavings during each pass along the workpiece.

It will be readily understood that the relative positions of the shaft 40 and the spindle 50 may be changed if desired, and also that the distance 56 between the bearings 57, 58 may be further increased to improve the stability of the workpiece 52. The exact position of the bearings 57, 58 will depend on the mounting of a so-called tensioning cylinder or chuck motor (not shown) which may be provided directly at the end of the spindle 50 or at a point adjacent thereto. In the latter instance, the action of the chuck motor may be transmitted to the point where tension is applied by means of a two-armed lever or the like.

As shown in FIG. 1, the arrangement of parts in the gear shaping machine is such that the operator may move into immediate proximity of the gear shaping station. This enables the operator to rapidly and conveniently exchange the tool 30 and/or the workpiece 52. For the same reason, the operator may reach and exchange the gear 21 or 31 if he desires to respectively change the r.p.m. of the tool 30 or the indexing of the workpiece.

It is well known that the quality of workpieces treated in a gear shaping machine depends on the dynamic behaviour of the machine, i.e., on the various motion transmitting gears on the one hand, and on the machine frame and slides on the other hand. As regards the construction and mounting of gears, it is very important that the rotation-transmitting connection between the workpiece and the shaping tool be as short as possible and that the gears in the groups of gears constituting this connection should transmit motion with little or no backlash. The frame and the slides should be rigid enough to withstand the stresses which arises when the machine is in operation and, in addition, the slides should be mounted with a view to prevent them from being lifted off the bedplate or from moving with lateral play in their respective guides. The arrangement of parts as shown in FIG. 1 has been found to constitute an optimum solution as regards the relationship of various gears to the frame and to the slides, as well as the position of the various gears with respect to the tool slide, to the work slide, to the tool holder and/or to the work spindle.

Referring back to FIGS. 1 and 2, it will be noted that there are only two groups of meshing gears in the driving connection between the main shaft 24 and the tool spindle 29, namely, a first group including the bevel gears 26, 26a which transmit rotary motion from the main shaft 24 to the shaft 27, and a second group including the spur gears 28a, 28b which transmit rotary motion from the shaft 27 to the tool spindle 29. On the other hand, there are only five groups of meshing gears for transmitting rotary motion from the main shaft 24 to the work spindle 50, namely, a first group including the gears 31–31c which drive the shaft 32, a second group including the clutch sleeve 36 and the gears 33–35 which drive the shaft 36a, a third group including the shaft 36a and the cylinder 38 which latter drives the gear 39, a fourth group including the gears 39, 39a which drive the shaft 40, and a fifth group including the parts 48, 49 which drive the work spindle 50. In the embodiment of FIGS. 1 and 2, there are no axially movable parts for transmitting rotation of the main shaft 24 to the tool spindle 29; this improves the dynamic behavior of the driving connection. An additional important advantage of the machine shown in FIG. 1 is that the motor 18 is mounted in the tool slide 12 because the weight of the motor is added to the weight of the slide. The weight of the slide 12 is further increased due to the fact that it accommodates the gear 21, 21a, the gear 31–31c and the reversing gear 33–36; in addition, and as mentioned hereinabove, such mounting of the gears 21–21a and 31–31c enables the operator to reach these gears without bending.

Figure 3:
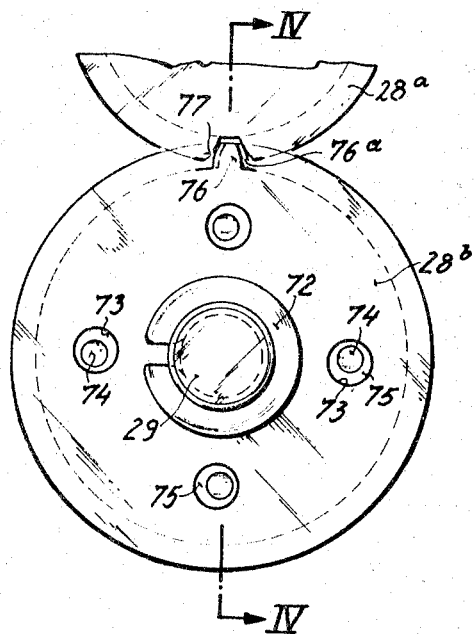
FIG. 3 is a fragmentary front elevational view of a pair of meshing spur gears which transmit rotary motion to the tool spindle of the machine shown in FIG. 1.
Figure 4:
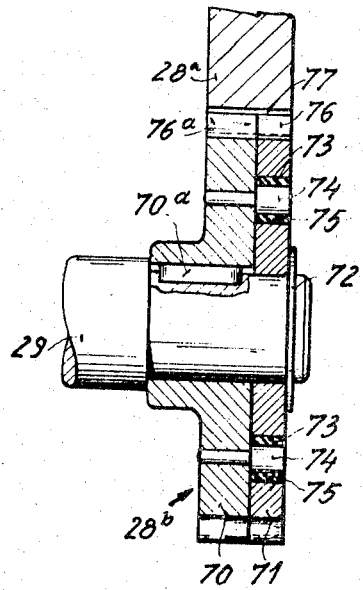
FIG. 4 is an axial section through the spur gears as seen in the direction of arrows from the line IV—IV of FIG. 3, showing a backlash-eliminating arrangement which is incorporated in the driven spur gear.

Referring to FIGS. 3, and 4, there is shown a composite spur gear 28b which is used in the machine of FIGS. 1 and 2. The gear 28b comprises a main gear element 70 and an auxiliary gear element 71, both mounted on the tool spindle 29. The main gear element 70 is non-rotatably secured to the spindle 29 by a key 70a and drives this spindle when receiving rotary motion from the pinion 28a. The auxiliary gear element 71 is rotatable on the spindle 29 and is held against axial movement by a washer 72 which may assume the form of a split ring and is received in an annular groove of the spindle 29. The element 71 is provided with several, preferably equidistant axially parallel bores 73 each of which receives the head of a bolt 74, and the stems of these bolts are screwed into or are otherwise anchored in the main gear element 70. As shown in FIG. 3, the heads of the bolts 74 are eccentrically received in the respective bores 73, and each of these heads is surrounded by a ring 75 of rubber or other suitable elastomeric material which tends to move the heads of bolts 74 into axial alignment with the respective bores 73. Consequently, the rings 75 always tend to bias the flanks of teeth 76 on the auxiliary gear element 71 into abutment with the flanks of teeth 77 on the pinion 28a in order to eliminate any play between this pinion and the composite spur gear 28b. In other words, when the teeth 76 of the element 71 are aligned with the corresponding teeth 76a of the main gear element 70, the bolts 74 deform the rings 75 to store energy in these rings and to insure that the rings bias the teeth 76 in a sense to move them out of alignment with the teeth 76a of the element 70 as soon as the teeth 76a do not bear against the teeth 77 of the pinion 28a. The rings 75 simultaneously prevent transmission of vibratory movements to the spindle 29 and reduce the noise of the gear shaping machine. Thus, the composite spur gear 28b embodies a vibration-, noise- and backlash-eliminating device to insure that rotary movements of the tool spindle are exceptionally smooth and that this spindle immediately reacts to any changes in rotational speed of the main shaft 24.

Similar backlash-eliminating devices may be provided in other sections of the gear shaping machine, e.g., between the components 21, 21a of the speed change gear, between the components 31b, 31c of the index change gear, between the components of the feed change gear in the housing 37, etc.

Figure 5:
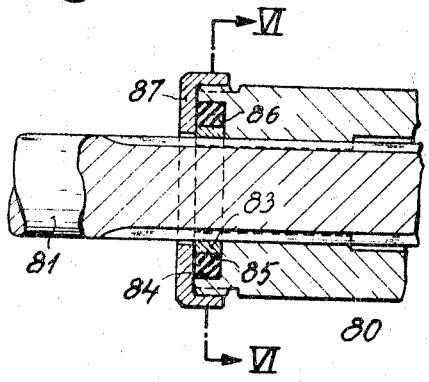
FIG. 5 is a fragmentary axial sectional view of an externally splined tool spindle and of an internally splined sleeve which transmits rotary motion to this spindle, further showing a backlash-eliminating arrangement which is mounted in the sleeve.
Figure 6:
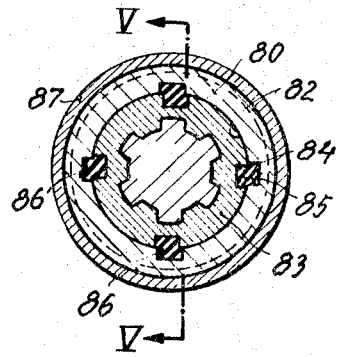
FIG. 6 is a transverse section as seen in the direction of arrows from the line VI—VI of FIG. 5.

FIGS. 5 and 6 illustrate a modified tool spindle 81 which replaces the spindle 29 of FIGS. 1–4. This modified spindle is externally splined and is axially movably received in an internally splined sleeve 80. The latter is assumed to be connected with and to receive motion from the spur gear 28b. At its rear left-hand end, the sleeve 80 is formed with a countersunk bore 82 whose diameter exceeds the diameter of the spindle 81 and which receives a hard internally splined ring 83 of such configuration as to snugly receive a portion of the splined spindle 81. The internal surface of the bore 82 and the external surface of the ring 83 are respectively provided with slightly misaligned pairwise arranged axially parallel recesses 84, 85 and each pair of these recesses receives a wedge or bar 86 of rubber or other suitable elastomeric material. The ring 83 is retained in its bore 82 by a screw cap 87 which meshes with an externally threaded end portion of the sleeve 80. In their unstressed condition, the wedges 86 are of rectangular cross-section and are deformed when they are received in the respective pairs of recesses 84, 85 which means that they tend to transmit torque to the ring 83 and thereby bias the external splines of the spindle 81 into abutment with the internal splines of the sleeve 80. In other words, the arrangement of FIGS. 5, 6 performs the same function as the arrangement of FIGS. 3, 4 by eliminating backlash and by preventing transmission of vibrations to the spindle 81 and hence to the non-illustrated tool which is mounted on this spindle. Similar backlash-eliminating combinations may be provided between the shaft 36a and the sleeve 38 and/or between the shaft portion 40a and the worm 48 of FIG. 1.

The importance of a backlash eliminating structure in the motion transmitting connection between the main shaft 24 and the tool will be readily understood with reference to FIGS. 7a and 7b. In FIG. 7a, a right-hand tool 30a is shown in a position of inclination it assumes while shaping a right-hand gear 52a'. The gear 28b is constructed in a manner as shown in FIGS. 3 and 4 so as to eliminate backlash when rotating in a clockwise direction. The tool spindle 29 is inclined upwardly with reference to a horizontal plane H which includes the axis of the main shaft 24 and makes therewith an angle alpha. The workpiece 52a' rotates in a counterclockwise direction and the axis of its spindle 50 is vertical.

In order to hob a left-hand gear 52b' with a left-hand tool 30b in a manner as shown in FIG. 7b, the tool 30b is mounted on the spindle 29 and the latter is inclined downwardly with reference to the horizontal plane H (see the angle minus alpha). The main shaft 24 rotates in the same direction as in FIG. 7a to drive the tool 30b in a clockwise direction; therefore, the gear 28b again eliminates backlash because the direction of its rotation remains the same as in FIG. 7a. As a rule, a backlash eliminator is effective in one direction only. Consequently, all such conventional gear hobbing machines wherein a left-hand tool must rotate in one direction and a right-hand tool rotates in the opposite direction must be furnished with two sets of backlash eliminators. By the simple expedient of assembling the motion transmitting connections for the tool and the workpiece in a manner as shown in FIGS. 7a and 7b, I insure that the same backlash eliminator can be used for both operations. This important advantage of my machine is attributable to the fact that the construction of the machine is unsymmetrical, i.e., that the slides 12, 14 are located at the same side of the frame 10. Since the backlash eliminators of the type shown in FIGS. 3–6 prevent transmission of vibratory movements, the wear on the tool is reduced considerably so that the intervals between consecutive sharpenings of the tool are longer than in heretofore known machines. This reduces the periods of idleness and contributes to higher output of such machines.

In presently known gear hobbing machines, the hob swivel head is swingable about a vertical axis and the direction in which the tool rotates must be reversed whenever the machine must be converted from treatment of left-hand gears to treatment of right-hand gears or vice versa. Therefore, such machines cannot utilize the same backlash eliminator for both types of operations. Also, conventional backlash eliminators cannot reduce vibrations and/or noise.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a machine for treating gears and similar toothed workpieces by means of hobs and analogous tools, a drive including a shaft rotatable in a predetermined direction; a tool holder turnable about the axis of said shaft; a tool supporting member rotatably mounted in said tool holder; a motion transmitting connection between said shaft and said tool supporting member, said connection including a backlash eliminating device which is operative when said shaft rotates in said predetermined direction; and a rotary work supporting member adjacent to said tool holder, said work supporting member being positioned with reference to said tool supporting member in such a way that, in response to turning of said tool holder about the axis of said shaft, a left-hand or right-hand tool affixed to said tool supporting member can treat a workpiece on said work supporting member while said shaft rotates in said predetermined direction.

2. A structure as set forth in claim 1, further comprising locking means for maintaining said tool holder in selected positions of adjustment with reference to the axis of said shaft.

3. A structure as set forth in claim 1, wherein said shaft is horizontal and the axis of said tool supporting member extends radially of said shaft, said work supporting member being rotatable about a vertical axis.

4. A structure as set forth in claim 1, wherein said backlash eliminating device comprises vibration reducing elements consisting of elastomeric material.

5. A structure as set forth in claim 1, wherein said motion transmitting connection further comprises a second shaft parallel with said tool supporting member and driven by said first named shaft, and a pair of meshing gears respectively mounted on said second shaft and said tool supporting member, said backlash eliminating device being incorporated in one of said gears.

6. A structure as set forth in claim 5, wherein said one gear is mounted on said tool supporting member and comprises two gear elements the first of which is fixed to and the second of which is rotatable on said tool supporting member, said backlash eliminating device comprising bolts anchored in one of said gear elements and extending with clearance into bores provided in the other gear element, and resilient means provided in said bores for transmitting torque to said second gear element so that the teeth of said second gear element tend to move out of registry with the teeth of said first gear element.

7. A structure as set forth in claim 1, wherein said tool supporting member comprises an internally splined spindle element and an externally splined sleeve element mounted on said spindle element, one of said elements being arranged to drive the tool and the other element being driven by said shaft, said backlash eliminating device being arranged to eliminate clearance between the splines of said elements.

8. A structure as set forth in claim 7, wherein said backlash eliminating device comprises a ring recessed into one end of said sleeve element and having internal splines meshing with the splines of said spindle element, said sleeve element and said ring being provided with partially misaligned bores, and resilient inserts provided in said bores for transmitting to said ring and to said sleeve element a torque acting in opposite directions.

9. A structure as set forth in claim 1, further comprising a support for said shaft having an arcuate groove concentrically surrounding the shaft, said tool holder comprising locking bolts having heads slidable in said groove and nuts for holding the bolts in selected positions to thereby fix the tool holder to said support.

10. In a gear hobbing machine, a tool supporting member arranged to rotate in a predetermined direction when carrying right-hand or left-hand tools; a drive for rotating said tool supporting member in said predetermined direction; and a motion transmitting connection between said drive and said tool supporting member, said connection comprising at least one backlash eliminating device which is effective when the tool supporting member is driven in said predetermined direction.

No references cited.

WILLIAM W. DYER, Jr., *Primary Examiner.*

G. A. DOST, *Assistant Examiner.*